United States Patent [19]

Pocek

[11] Patent Number: 5,285,199

[45] Date of Patent: Feb. 8, 1994

[54] METHOD AND APPARATUS FOR IN-BAND DATA TRANSMISSION

[76] Inventor: Slobodan Pocek, 129-H Gaither Dr., Mount Laurel, N.J. 08054

[21] Appl. No.: 646,194

[22] Filed: Jan. 28, 1991

[51] Int. Cl.$^5$ .................. H04Q 3/00; H04B 3/46
[52] U.S. Cl. .................. 340/825.03; 370/94.1; 370/111; 370/13; 371/20.1
[58] Field of Search .................. 370/13, 13.1, 14, 15, 370/17, 55, 110.1, 111, 85.8, 95.2, 60, 60.1, 94.1, 94.2, 94.3, 84, 112, 79; 375/10, 7, 8, 36; 379/6, 8; 371/20.1, 20.3; 455/67, 58.1; 340/825.08, 825.07, 825.06, 825.54, 825.03, 825.5

[56] References Cited

U.S. PATENT DOCUMENTS

| | | | |
|---|---|---|---|
| 4,581,746 | 4/1986 | Arnold | 370/111 |
| 4,752,940 | 6/1988 | Graham | 371/20.1 |
| 4,787,025 | 11/1988 | Cheselka et al. | 364/200 |
| 4,918,623 | 4/1990 | Lockitt et al. | 375/10 |
| 4,954,950 | 9/1990 | Freeman et al. | 364/200 |
| 4,996,695 | 2/1991 | Dack et al. | 370/13 |
| 5,072,447 | 12/1991 | Perloff et al. | 371/20.1 |

Primary Examiner—Benedict V. Safourek
Assistant Examiner—Hassan Kizou
Attorney, Agent, or Firm—Leydig, Voit & Mayer

[57] ABSTRACT

An apparatus which transmits in-band data having a host computer which transmits a data stream to a remote terminal via host and remote modems. A network management device is provided which transmits independent system messages to and from the remote terminal. To insert and delete the independent messages in the data stream without disturbing the existing data stream, a message insertion and deletion processor is provided.

22 Claims, 3 Drawing Sheets

METHOD AND APPARATUS FOR IN-BAND DATA TRANSMISSION

TECHNICAL FIELD

This invention relates to in-band transmission of data across communication lines.

BACKGROUND OF THE INVENTION

Computer systems are typically accessed from terminals placed in user-convenient locations. In many computer applications, terminals are situated at remote locations. Oftentimes, these locations are scattered throughout a building or a plant site. It may even be desirable to access a host computer from different points in a city or from different cities. In all of these cases, a communication link is needed to transmit data between the host computer and the terminals. A standard communication link used for this purpose is a series of modems connected to a transmission line.

It is frequently desired to transmit independent system messages such as network management commands and responses for management of communication devices over data transmission lines without disturbing the existing data stream. These system messages may be either supporting a specific propriety network management protocol or they may be compatible with standard protocols.

SUMMARY OF THE INVENTION

It is an object of the instant invention to provide an apparatus and method for transmitting independent system messages over data communication lines in addition to an ongoing stream of user data message.

Another object of this invention is to provide an apparatus for inserting and deleting independent system messages to and from a communication line.

Yet another object of this invention is to provide an apparatus for inserting and deleting independent system messages to and from a communication line without disturbing user data messages.

Still another object of this invention is to provide a method for inserting and deleting independent system messages to and from a communication line without disturbing user data message.

It is a further object of this invention to provide a method and apparatus for controlling the speed of data message exchanges.

Yet another object of this invention is to provide an apparatus which tests digital communication equipment by adding independent system messages to a communication line.

These and other objects are satisfied by an apparatus for in-band data transmission through communication lines, comprising:

a host computer which generates and transmits a data stream;

a host modem associated with said host computer which converts the data stream into frequency signals which are transmitted across communication lines;

generating means for generating independent system messages;

processor means for inserting and deleting the independent system messages into and from the data stream; and at least one remote modem which receives the independent system messages and transmits a response message to said processor means, and which converts frequency signals into a data stream and transmits the data stream to an associated terminal;

whereby independent system messages are inserted into the communication line without disturbing data transmission of said host computer.

The method of this invention uses existing standard communication protocols to logically multiplex additional independent messages into an on-line data stream. Independent system messages are those messages which are not generated by communication line end-point devices such as the host computer or terminal but instead are generated by a separate message generator such as a network management system or test device, or a separate communication port of the host computer.

Each protocol includes pacing commands for controlling the rate of flow of the stream of user data. The pacing commands provide a controlled brief pause in the on-line transmission of data messages. According to the method of this invention, the independent messages are inserted into and deleted from communication line during the pacing pauses.

Further objects and advantages of the instant invention will be apparent from the following brief description of the drawings and description of the embodiments.

DESCRIPTION OF THE BEST MODE

Figure 1:
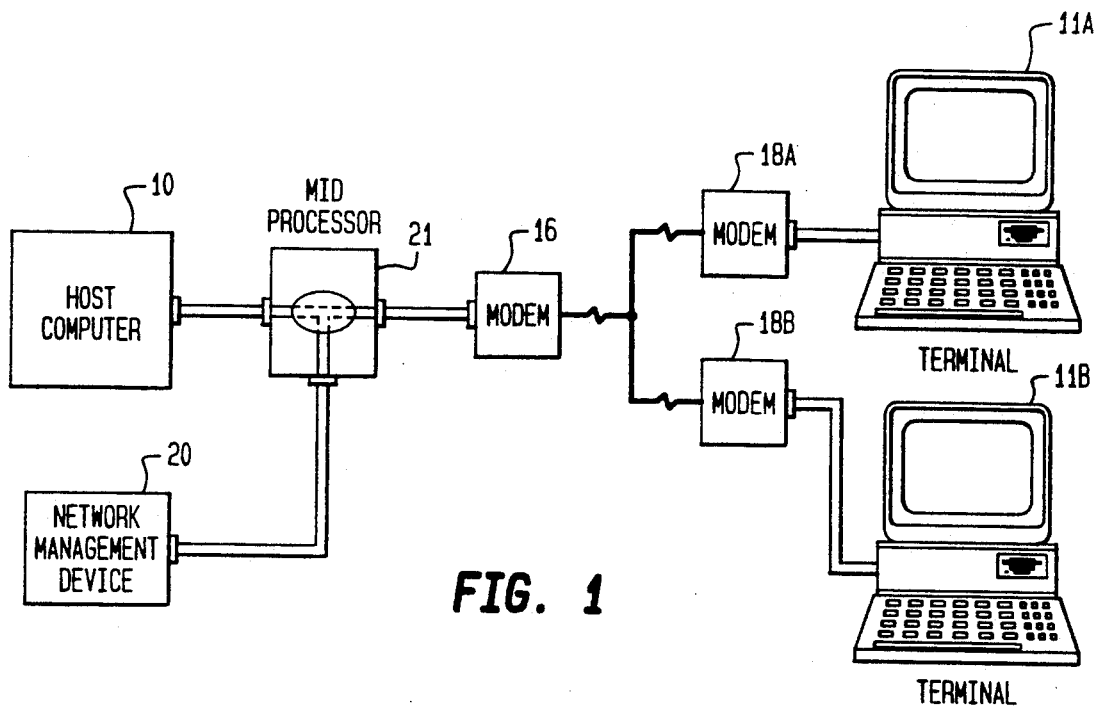
FIG. 1 is a block diagram showing an apparatus for in-band data transmission with an SDLC network over a multipoint line according to the instant invention.

FIG. 1 depicts an apparatus constructed according to the invention for in-band data transmission in a network. While the network may include many computers, terminals and communication devices, for purposes of explaining the invention a simple network is shown in FIG. 1. The network includes a host computer 10 which transmits a continuous stream of data messages under control of its transmission protocol to remote terminals 11A and 11B via a host modem 16 and remote modems 18A and 18B. A network management device 20 is also provided which transmits independent system messages to network equipment, in particular the modems or other transmission devices on the network. The independent system messages have varied purposes including, obtaining status reports, carrying out tests and diagnostics, controlling the devices and obtaining topology reports. The nature of the message transmitted is dependent on its purposes and these are only examples of the types of functions which can be performed with various conventional network management devices. In addition the network management device 20 receives responses from the network equipment such as a response from a diagnostic test of a modem.

In accordance with the invention, to insert the independent system messages from the device 20 into the user data stream, and to delete references and commands, without disturbing the ongoing user data stream traffic between the host computer 10 and the terminals 11A and 11B, a message insertion and deletion (MID) processor 21 is provided. In carrying out the method aspects of this invention the MID processor 21 searches for an appropriate sequence of protocol exchanges after it has received an independent system message, an example of the independent system message being a command requesting execution of a modem self-test on a remote modem 18A. When applied to a network using Synchronous Data Link Control (SDLC) protocols, for example, the MID processor 21 searches for a Receiver Ready (RR) host message with the poll bit set and deletes the poll message from the line. It then transmits a Receiver Not Ready (RNR) pacing protocol command to the host computer 10 which creates a temporary "busy out" condition thus temporarily inhibiting transmission of user data from the host computer 10. At this time the mid processor 21 inserts an independent system message into the line and sends the message to the remote modem 18A. The MID processor 21 continues to "busy out" the host computer 10 until it receives a response to the inserted message in this example,—the results of the remote modem self-test. Once the response is received, the MID processor 21 deletes the response and becomes transparent and allows the host computer 10 to resume transmission of user data.

When employing SDLC communication lines, the apparatus for transmitting independent system messages over data communication lines may be configured as depicted in FIG. 1. There, the MID processor 21 is shown connected in-line between the host computer 10 and the host modem 16. The network management device 20 used in this embodiment, connected solely to the MID processor 21, may be, for example a PhyLog 3000 network management system manufactured by NetQuest Corporation. The host modem 16 and remote modems 18A, 18B are joined by the SDLC type communication line and they are adaptable to RS.232 (V.24, V.28) and V.35 digital equipment interfaces. Each remote modem 18A, 18B is connected to a respective remote terminal 11A, 11B. Accordingly, when the host computer 10 is subject to a "busy out" signal, the network management device 20 is effectively connected in-line with the MID processor 21 thus allowing transmission of independent system messages between the network management device 21 and all other equipment on the line without interference with or by the user data stream generated by the host.

Figure 2:
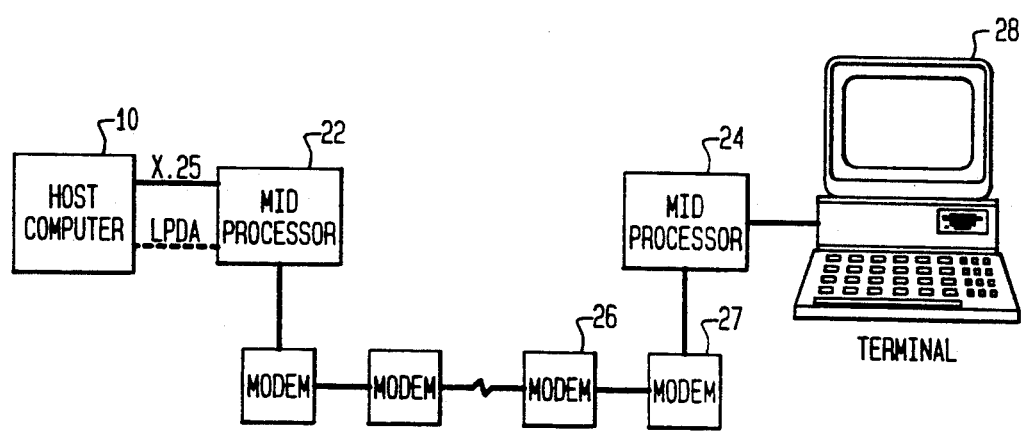
FIG. 2 is a block diagram depicting an apparatus for in-band data transmission with an X.25 Packet Switching network over a point-to-point line according to the instant invention.

While explained with relation SDLC networks, the invention is not restricted application to SDLC networks but is also applicable to other networks using protocols with data transfer pacing commands or signals. As another example, in-band transmission apparatus of this invention can be used with Packet Switching networks. FIG. 2 illustrates a pair of MID processors 22 and 24 employed in an X.25 Packet Switching network. This network differs from that of FIG. 1 in that a remote MID processor 24 is employed. Furthermore, no separate network management device is necessary because the host computer 10 generates Link Problem Determination Aid (LPDA) messages for insertion into the data stream. However, X.25 protocols are not compatible with LPDA message formats, therefore, the host MID processor 22 and the remote MID processor 24 convert LPDA messages into X.25 packets in order to transport these messages over the X.25 network.

In carrying out additional method aspects of the invention particular to the packet switching network, the remote MID processor 24, connected in-line between a remote modem 26 and a remote terminal 28, deletes LPDA packets from the line, converts them into standard LPDA messages and performs the LPDA tests on the remote modem 26 and 27. When the Mid processor 24 receives LPDA test results, it converts the LPDA message into a packet for transport over the X.25 network back to the host MID processor 22. The host MID processor 22 then converts the packet back to standard message form and sends it back to the host computer 10.

Figure 3:
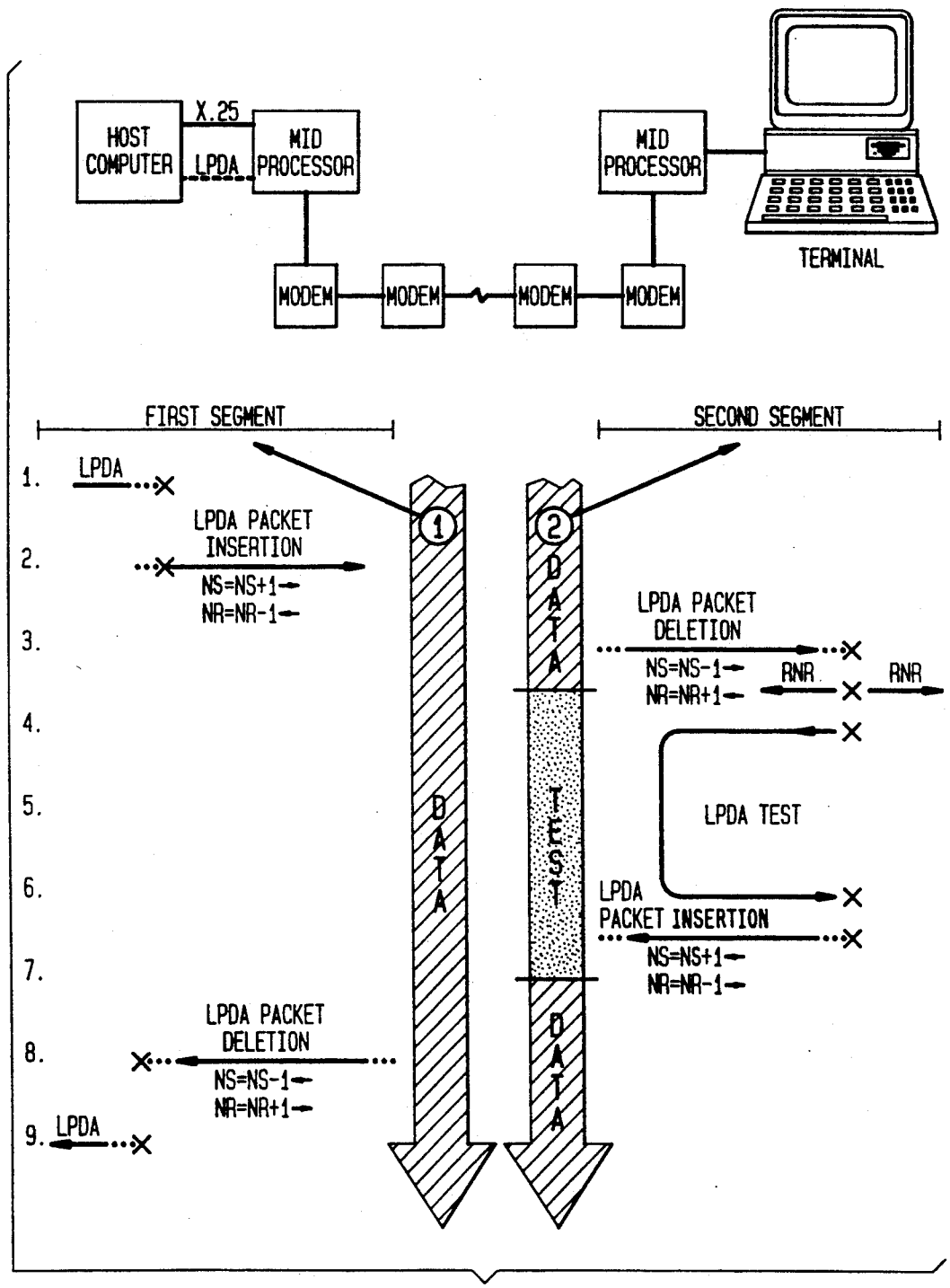
FIG. 3 is a diagrammatic illustration representing a method of message insertion and deletion in accordance with the present invention.

Referring to FIG. 3 a diagrammatic illustration of the packet insertion and deletion method is depicted. The MID processors 22 and 24 maintain a count of the number of records received (NR) and the number of records sent (NS). A record as used herein below refers to an independent system message packet such as an LPDA packet. Each time a MID processor inserts a message into the line, the NR and the NS must be adjusted by one message count since the sending and receiving X.25 equipment, the host computer and the remote terminal, cannot account for the additional line message. More particularly, referring to steps 1–9 of FIG. 3, when an LPDA packet is inserted into the line, host MID processor 22 sets NS=NS+1 and NR=NR−1. When the LPDA packet reaches the remote portion of the line, remote MID processor 24 deletes the packet and sets NS=NS−1 and NR=NR+1. The remote MID processor 24 then generates Receiver Not Ready commands and transmits them to the network and to the remote terminal 28 which temporarily inhibits transmission of user data stream traffic from the network and from the X.25 terminal. The LPDA command, for example a test command, is then directed to a targeted network element, such as the remote modem 26. The targeted network element generates a command response which is inserted into the line as an LPDA packet by the remote MID processor 24. At that time the remote MID processor 24 sets NS=NS+1 and NR=NR−1. When the command response reaches the host portion of the network, host MID processor 22 deletes the LPDA packet from the line and sets NS=NS−1 and NR=NR+1. In this fashion, both the host MID processor 22 and the remote MID processor 24 maintain an accurate count of the total number of records sent and the total number of records received in a given time period.

Figure 4:
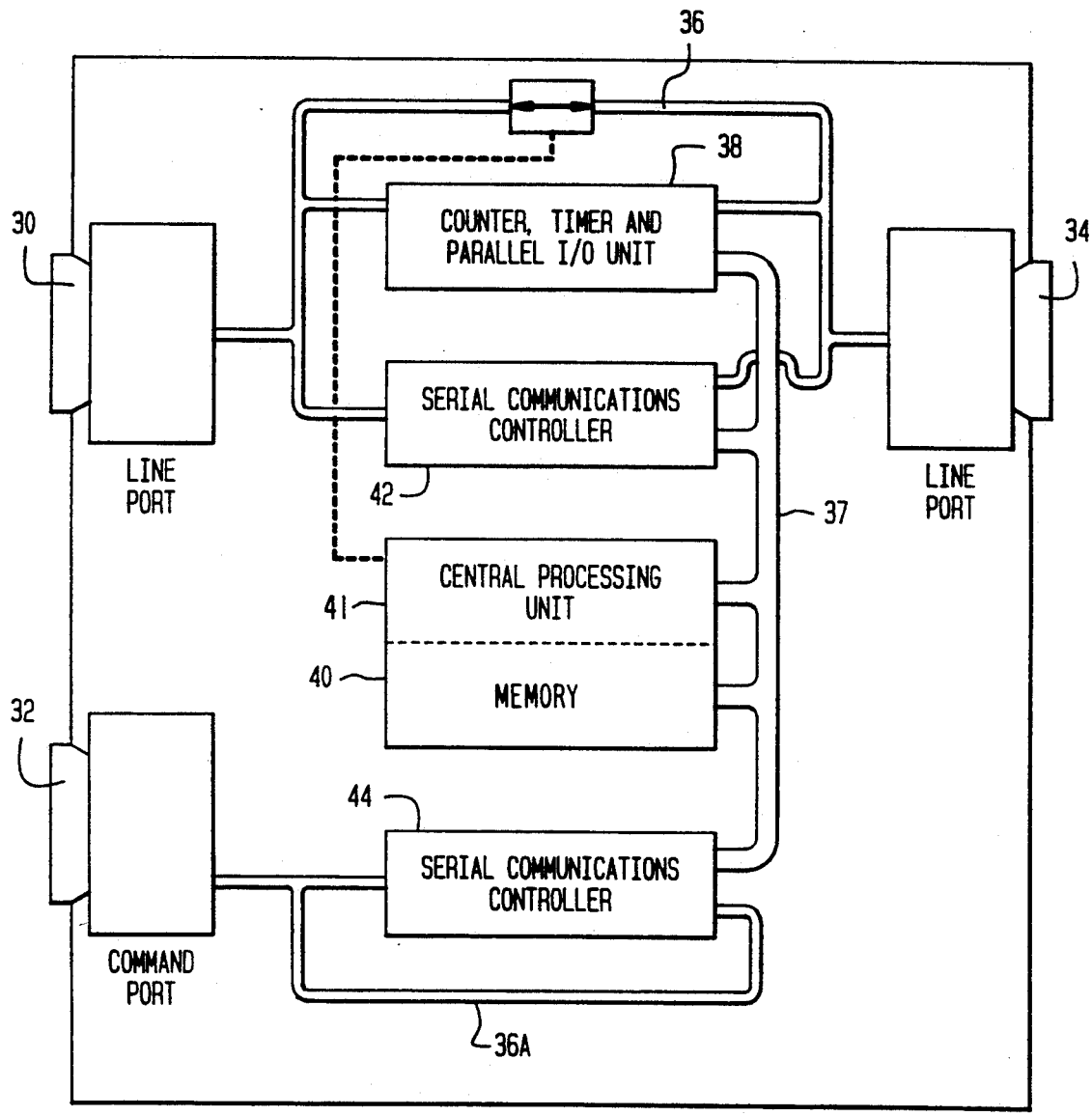
FIG. 4 is a block diagram of the MID processor used in the instant invention.

In keeping with the hardware aspects of the invention, the construction of a MID processor is illustrated in FIG. 4. The MID processor generally comprises three ports 30, 32, 34 including a first line port 30, connected to the terminal (or host computer). A command port 32 is connected, for example, to a network management device as in FIG. 1, and a second line port 34 is connected to a modem (or other communication device) in the line itself. A TTL bus 36 connects the first and second line ports 30 and 34 and transmits the ongoing stream of user data. A second TTL bus 36A and a data bus 37 connect the command port 32 to the second line port 34 to transmit independent messages received through the command port and insert such messages into the data stream under the control of the MID processor. To achieve this, the MID processor includes a CPU 41, preferably a Z80, on the data bus 37, a memory 40 for storing programs and data for operating the MID processor, a counter, timer, parallel I/O unit 38, and two communications controllers 44 and 42.

Moving now to matters of operation, referring to FIG. 4, when the MID processor is in its transparent mode the host computer 10 generates a data stream that is input into the MID processor through first line port 30 and flows through the serial TTL bus 36 and is output through the second line port 34 to a host modem or other communication device in the line. When the MID processor is in its message insertion mode it receives an independent system message through command port 32 from either a network management device or a host computer, or another of command messages. The received message is directed to the serial communications controller 44 and output through the second line port 34.

In an SDLC network, initiation of the MID process interrupts the transparent mode and the user data stream carried by the serial TTL bus line 36 is directed to the CPU. The user data stream is monitored through the I/O unit 38 and serial communications controller 42.

When the MID processor of FIG. 4 is used in X.25 networks the user data stream is always passed through the I/O unit 38 and the serial communications controller 42. In this application the I/O unit 38 also serves as a counter for incrementing and decrementing the number of records sent and the number of records received by the MID processor each time an independent system message is inserted or deleted.

In constructing the MID processor the I/O unit 38 may be implemented by a Z8536 chip, while the serial communications controllers may be implemented by Z8531 chip.

If desired the in-band data transmission apparatus using SDLC lines can be configured in both the point-to-point configuration and the multipoint configuration, whereas, X.25 lines must be in the point-to-point configuration.

The MID processor can accomodate a variety of protocols in addition to X.25 and SDLC types, including but not limited to: LPDA-1, LPDA-2, Hayes AT, V.25 bis, asynchronous and bisynchronous protocols. While the independent system messages generated by the network management device described above are modem test commands, other messages can be employed in similar fashion such as alarm reporting and monitoring of communication lines.

The illustrated embodiments having been described, it should be noted that numerous variations, modifications and other embodiments will become apparent to a person having ordinary skill in the art.

I claim:

1. A method of in-band data transmission between a first data terminal device and a second data terminal device where messages are inserted to and deleted from a communication line connecting the first and second data terminal devices, the method comprising the steps of:

monitoring protocols in a data stream flowing from the first data terminal device to the second data terminal device which is present in the communication line to determine when the data stream contains protocols having polling messages;

deleting the polling messages from the data stream;

temporarily inhibiting transmission of the data stream from the first data terminal device after the polling messages have been deleted;

inserting an independent system message generated by an independent system message generator into the communication line between the first data terminal device and a local transmission device and directing the independent system message downstream towards a remote transmission device and the second data terminal device;

deleting the independent system message from the communication line after the independent system messages has been received by the remote transmission device and before the independent system messages reaches the second data terminal device;

generating a response message to the independent system message after the function requested by the independent system message has been performed and directing the response message upstream toward the first data terminal device;

deleting the response message from the communication line after the response message has reached the local transmission device but before the response message reaches the first data terminal device, and;

resuming transmission of the data stream after the response message has been deleted.

2. A method of in-band data transmission as in claim 1 using X.25 protocols.

3. A method of in-band data transmission as in claim 1 using SDLC protocols.

4. A method of in-band data transmission as in claim 3 where independent system messages are inserted in the communication line only in response to a Receiver Ready message from the second data terminal.

5. A method of in-band data transmission as in claim 1 where inserted independent system messages are control commands.

6. A method of in-band data transmission as in claim 2 further comprising the step of converting the inserted independent system message into packets for transfer across the communication line.

7. A method of in-band data transmission as in claim 6 further comprising the step of obtaining a count of messages sent from the first data terminal device and the independent system message generator and obtaining a count of the messages to be received by the first data terminal device including messages generated by the second data terminal device and response messages deleted from the communication line.

8. A method of in-band data transmission as in claim 7 further comprising the step of incrementing the count of messages sent each time an independent system message is inserted into the communication line.

9. A method of in-band data transmission as in claim 1 where inserted independent system messages are test commands for data communications equipment.

10. An apparatus for in-band data transmission across a communication line, comprising:

a host computer connected to the communication line which generates and transmits a first data stream;

a host modem associated with said host computer which modulates the first data stream into frequency signals which are transmitted across the communication line;

generating means connected to the communication line for generating independent system messages;

processor means connecting the generating means to the communication line for inserting and deleting respectively the independent system messages and responses thereto into and from the communication line wherein said processor means monitors the first data stream and inserts selected independent system messages only in response to selected protocols contained in the first data stream and is otherwise transparent to the first data stream; and at least one remote modem which receives the independent system messages and transmits a response message to said processor means, and which converts frequency signals into a second data stream and transmits the second data stream to an associated terminal.

11. An apparatus for in-band data transmission as in claim 10 where said generating means is a network management system.

12. An apparatus for in-band data transmission as in claim 10, where said processor means comprises an insertion/deletion processor.

13. An apparatus for in-band data transmission as in claim 10, where said processor means includes:

a first serial communications controller;

an I/O unit electrically connected to said first serial communications controller which cooperates with said first controller to monitor the first data stream;

a first port in electrical communication with said host computer, said first serial communications controller and said I/O unit;

a second port in electrical communication with the host modem, said first serial communications controller and said I/O unit;

a third port which receives the independent system messages;

a second serial communications controller in electrical communication with said third port, said first serial communications controller and said I/O unit which receives independent system messages from said third port;

memory means for storing programs and data for operating said processor means, said memory means electrically connected to said I/O unit and said first and second ports.

14. An apparatus for in-band data transmission as in claim 10 where said processor means temporarily delays transmission of the first data stream from said host computer during insertion of the independent system messages and resumes transmission of the first data stream after insertion of the independent system messages.

15. An apparatus for in-band data transmission as in claim 13, where said first serial communications controller and said I/O unit monitor the first data stream.

16. An apparatus for in-band data transmission, comprising:

a host computer which generates and transmits an outgoing user data packet stream across a communication line;

generating means for generating independent system messages;

first processor means for segmenting the independent system messages into packets and inserting the independent system messages into the communication line, said first processor means being in electrical communication with said host computer and said means for generating independent system messages, wherein said first processor means monitors the outgoing user data packet stream and inserts selected independent system messages in packet format into the communication line responsive to detection of selected protocol messages contained in the outgoing user data packet stream;

a local modem electrically connecting said first processor to the communication line, said local modem modulating the outgoing user data packet stream and the independent system messages into frequency signals;

at least one remote modem connected to said local modem via the communication line which receives the frequency signals from said local modem, demodulates the frequency signals into the outgoing user data packet stream and the independent system messages, and which transmits the outgoing user data packet stream and the independent system messages in packet form towards an associated terminal device; and a second processor means for deleting the independent system messages in packet form from the communication line, said second processor means being in electrical communication with said remote modem and said associated terminal device, where said second processor means receives the independent system messages in packet format and converts the independent system messages into original independent system message format as generated by said means for generating independent system messages and processes the converted independent system messages.

17. An apparatus for in-band data transmission as in claim 16, where said generating means is a network management system.

18. An apparatus for in-band data transmission as in claim 17, where each of said first and second processor means is a message insertion deletion processor.

19. An apparatus for in-band data transmission as in claim 16, where each of said first and second processor means includes:

a first serial communications controller;

an I/O unit electrically connected to said first serial communications controller to monitor the user data packet stream;

a first port in electrical communication with said host computer, said first serial communications controller and said I/O unit;

a second port in electrical communication with said local modem, said first serial communications controller and said I/O unit;

a third port connected to said generating means;

a second serial communications controller in electrical communication with said third port said first serial communications controller and said I/O unit;

memory means for storing programs and data for operating the associated first or second processor means, said memory means being in electrical communication with said I/O unit and said first and second serial communications controllers.

20. An apparatus for in-band data transmission as in claim 19 where said first serial communications controller and said I/O unit monitor the outgoing user data packet stream.

21. An apparatus for in-band data transmission as in claim 16 further comprising means for supplying a user data packet stream to said second processor where said second processor means monitors the user data packet stream and inserts responses to the independent system messages into the communication line responsive to detection of selected packet protocol messages contained in the user data packet stream.

22. A method of in-band data transmission in a communication system including a host terminal coupled to a first modem, and a remote terminal coupled to a second modem where messages are inserted to and deleted from a communication line connecting, the first and second modems, the method comprising the steps of:

generating a first user data packet stream for downstream transmission in the communication line in the direction of the remote terminal;

generating independent system messages;

segmenting the independent system messages into independent system packets;

detecting protocol messages within the first user data packet stream;

inserting selected independent system packets into the communication line responsive to detection of protocol messages contained in the first user data packet stream;

modulating the first user data packet stream and in the independent system packets into frequency signals at the first modem;

transmitting the frequency signals downstream along the communication line towards the remote terminal;

demodulating the frequency signals into the first user data packet stream and the independent system packets at a downstream location on the communication line at the second modem;

deleting independent system packets from the communication line before the independent system packets reach the remote terminal;

generating test signals and test messages and transmitting the test signals and test messages to the second modem;

generating response messages in packet format and transmitting the response messages upstream towards the host terminals;

converting the response messages in packet format to response messages in independent system message format and transmitting the converted response messages towards the host terminal.

* * * * *